March 15, 1955 A. B. SOWTER 2,703,997

MEANS FOR AND METHOD OF COLD PRESSURE WELDING

Filed June 1, 1950

INVENTOR
ANTHONY BAGNOLD SOWTER

BY [signature]

ATTORNEY

United States Patent Office 2,703,997

Patented Mar. 15, 1955

1

2,703,997

MEANS FOR AND METHOD OF COLD PRESSURE WELDING

Anthony Bagnold Sowter, Wembley, England, assignor to The General Electric Company Limited, London, England Application June 1, 1950, Serial No. 165,521

Claims priority, application Great Britain March 8, 1950

3 Claims. (Cl. 78—470.1)

This application is a continuation-in-part of application Serial No. 123,315, filed October 25, 1949, now Patent No. 2,522,408, issued September 12, 1950, entitled Cold Pressure Welding.

The present invention relates to cold pressure welding, i. e. the welding together of two members of ductile metal solely by pressure and substantially without any intentionally applied external heat.

One of the objects of the invention is the provision of means for and a method of cold pressure welding a first member to a second member by a substantially circular or ring-shaped weld, said members consisting of either the same or different metal capable of being cold pressure welded.

Another object is the provision of and means for and a method of producing a substantially ring-shaped cold weld connecting two metallic members superimposed one upon another, wherein a favorable flow of metal is insured at welding.

Still another object of the invention is the provision of means for and a method of cold pressure welding one member to another, each of said members consisting of ductile metal or alloy capable of being cold pressure welded, wherein the pressure or tools which effect the weld also serve to form or forge one and/or the other of the members into a desired shape. In other words, the welding operation is accompanied by a cold forging or hobbying operation.

Besides numerous other applications, the invention may be used for manufacturing electrical contacts, wherein the current carrying capacity of the contact, especially at the connection between the contact proper and a contact arm or support, is substantially increased compared with prior contact structures; wherein the bond between the contact and the contact arm is made so strong that it cannot be disrupted or interfered with under extreme arcing conditions; and wherein the connection between the contact and the contact arm is physically stronger than has heretofore been possible in similar connections.

While the invention will be described and explained in the following with specific reference to the manufacture of electrical contacts, it is understood that the novel method of combined cold pressure welding a first member to a second member and utilizing the metal displaced as a result of the cold welding operation for forming or forging one or both of said members into a desired shape, has many other uses and applications, as will become apparent as the following description proceeds.

With specific reference to the manufacture of electrical contacts, the invention contemplates essentially the utilization of cold pressure welding to produce a completely new contact, wherein a contact element of an appropriate current carrying material such as silver is secured by a ring-shaped cold weld to a contact arm or other contact support of an appropriate conducting material such as copper, in such manner that no foreign material such as binders, fluxes, solders, or other elements are required at the interface between said arm and element.

In this way, a contact is produced which has a perfect current carrying engagement between the contact element and the contact arm and no other elements are present which may increase the transition resistance at the interface. In addition, such a contact obviates the weakening or softening of the material which has heretofore often

2 been an inherent result of prior welding or brazing operations.

The utilization of cold pressure welding to interengage a contact element with a contact arm, which may also serve to form the shape of the contact element, results in a hardening or toughening of the engaged portions of the contact element and the contact arm due to strain or work hardening of the metal resulting from the cold welding operation, thereby increasing the structural strength of the contact and its ability to withstand the impact of successive tripping or closing operations. The contact arm itself may also be forged during the welding operation to give it both the required shape and strength.

As is well known, in circuit breaker and other switch gear design, when the circuit is closed the engagement between contacts must be made rapidly and firmly. Consequently, great stresses are often set up in the contact arm and where the contact arm and the contact element itself have been softened by ordinary welding or equivalet processes, the design must include some provision, such as increased cross-section or other reinforcements, to compensate for this softening.

Also, in the opening of circuit breakers, it is essential that any mechanical delay in the extinguishment of the arc be reduced to the absolute minimum and for this reason contact arms are biased toward opening position by powerful springs which in turn exert an exceedingly great impact force on the contact arm when it reaches the stop in the open position.

Again where contact elements have been secured to contact arms by known welding or like processes, the softening of the contact arm at the weld requires greatly increased cross-section or other reinforcing means in order to withstand this impact. The degree of the shock or impact which must be withstood may be better understood from the fact that many large circuit breakers are designed to reach current zero after the occurrence of a tripping current within .016 second. Within such an extremely short period of time the tripping unit of the circuit breaker must operate to release a latch, the spring must then pull the contact arm open and the arc must be extinguished. Since in many of the larger circuit breakers the opening force exerted by the springs may be measured in hundreds of pounds, the magnitude of the impact which the contact arm must withstand may now be understood.

Accordingly, one of the more specific objects of the invention is the production of a novel electrical contact, wherein the contact element is secured directly to a contact arm or support and wherein no alien substance is present at the interface.

Another object is the arrangement of a contact element and contact arm as above, whereby the hardness of the contact element and contact at least at the areas of interconnection therebetween, is increased.

The foregoing and further objects and novel aspects of the invention will become more apparent from the following detailed description taken in connection with the accompanying drawings, forming part of this specification, and in which.

Like reference characters identify like parts throughout the different views of the drawing.

Figure 1:
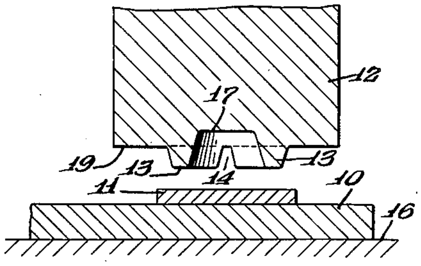
Figure 1 is an elevation in cross-section showing, by way of example, one manner of forming and welding a contact or similar member unto another member in accordance with the invention, the members being shown in the position before welding.
Figure 2:
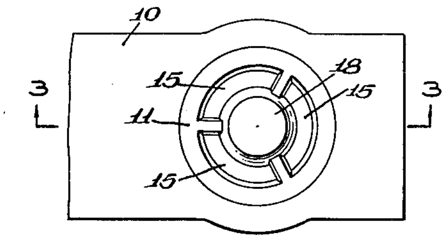
Figure 2 is a plan view of a contact element and contact arm obtained by means of an apparatus shown in Figure 1.
Figure 3:
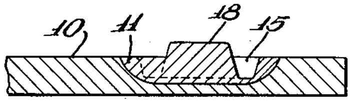
Figure 3 is an enlarged cross-sectional view taken on line 3—3 of Figure 2.
Figure 4:
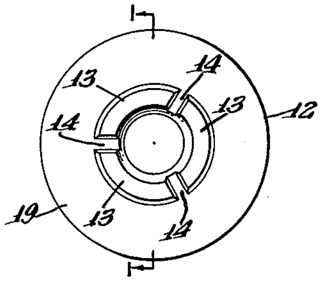
Figure 4 shows an end view of the welding face of the tool or die shown in Figure 1.

Referring more particularly to Figures 1 to 4, the contact arm or support 10 may be made of any suitable current carrying material such as copper which may in turn be in the form of an appropriate alloy or otherwise hardened to withstand the strains to which it will be subjected in operation. It will, of course, be of a material of sufficient ductility to be weldable by cold pressure welding.

The member 11 is formed by a flat circular disc of silver and is laid on the contact arm 10 after the surface of the latter and the under surface of the disc 11 at the interface have been fully cleaned to ensure a metal-to-metal contact without the intervention of foreign particles or oxide films. The cleaning may simply be done by wire scratch-brushing preceded, if necessary, by chemical cleaning.

A tool or die 12 having three welding tips 13 is then brought down on the member 11. As shown more clearly in Figure 4, the welding tips 13 are arcuate flat surfaced segments separated by slots 14 and form arcuate grooves 15 in the member 11. The member 10 rests upon a flat steel anvil 16.

Inwardly of the welding tips 13, the tool 12 is provided with a recess 17 and, as the tool 12 is brought down on the disc or element 11, the metal of the disc, besides flowing radially outwardly, is forced up into the recess 17 and a forging or hobbing action is obtained. The cold pressure welding operation therefore forms the shape of the contact, producing a tip 18 which, in practice, engages another contact. The tool 12 is brought down until it engages the upper surface of the arm 10 by its flat face or shoulder 19 and, as will be seen in Figure 3, the contact element 11 is firmly welded to and in the arm 10 with the top surface of the element 11 being flush with the surface of the member 10 except for the projecting tip or element 18 and the grooves or indentations 15. Actually, the welded areas between the members 10 and 11 lie under the grooves 15 and, to a certain extent, beneath the central tip 18.

In order that an appreciation may be had of the relative sizes of the tools and parts, satisfactory results were obtained in welding a disc of silver having a diameter of ¼″ and a thickness of 0.032″ to copper of 0.04″ thickness, with the tool 12 having a diameter of ⅝″, with the radial width of the welding faces or segments 13 equal to 0.035″ and their projection from the shoulder 19 equal to 0.031″. In other words, the width of the pressing or welding areas is about equal to the thickness of the members to be welded, thus insuring a favorable flow and displacement of the metal in directions laterally of the longer or arcuate sides of the pressed areas and in turn resulting in an intimate bond or welding of the surfaces by a minimum of applied pressure. Furthermore, the depth of penetration of the dies or pressure tips 13 controlled by the height of the tips or by a suitable stop associated with the pressure producing apparatus, is so chosen as to produce a minimum reduction in the thickness of the material at the weld, sufficient to provide adequate mechanical strength of the welding joint. In the example given, with copper forming the softer or base material and the disc or member to be welded thereto consisting of silver having a greater hardness, the partial reduction of the total thickness of the members is about 86%, this value being characteristic for copper as to its degree of cold weldability.

In the case of a combined welding and forging or hobbing action as described, the gaps 14 between the arc-shaped pressure tips 13 should be sufficiently close, being about equal to the width of the tips as shown in the drawing, whereby to force the major portion of the metal displaced from the inner sides of the welding areas 15 into the recess 17 and to provide only a limited pressure outlet in the radial outward direction between the areas 15. The tips 13 may be designed, however, with any desired size of the gaps 14 therebetween, to control the relative flow of metal into the recess 17, on the one hand, and in the radial or outward direction, on the other hand, depending upon the size of the contact or tip 18 to be formed. In the extreme case, where no tip or projection is desired, or where the latter has been pre-formed or otherwise secured to the disc 11, the gaps 14 between the arcuate welding areas should have a sufficient width to afford an adequate pressure outlet or ready metal flow, without causing any excessive distortion of the metal within the space enclosed by the welds 15.

As will be seen from the drawing, the segments 13 have tapered sides about a 20° taper on each side.

The ultimate result here produced is that a contact or similar element 11 which may consist of silver or any other suitable cold weldable material is secured directly to an arm or support 10 without the necessity of introducing any foreign materials at the interface, while at the same time the point of connection is hardened and toughened by the securing process. Furthermore, the welding may form the shape of the element, besides increasing the hardness of the silver and the copper.

Figure 5:
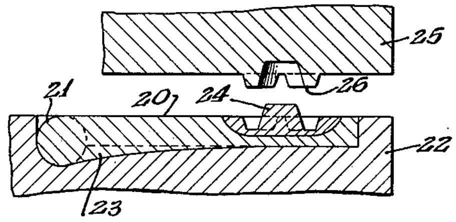
Figure 5 is an elevation in cross-section showing another manner of forming a contact or the like upon a support in accordance with the invention, the elements being shown after welding.
Figure 6:
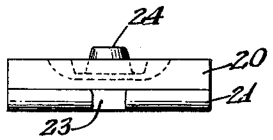
Figure 6 is an end view of the contact shown in Figure 5.

Referring to Figures 5 and 6, these show how the shapes of both the element and the arm may be forged during the welding operation, the arm being given a required shape and strength. Here the arm 20 is made by casting from copper or other cold weldable metal with a slight rib 23 on its back and a boss 21 to be drilled later for pivoting. The casting fits in a suitably grooved flat anvil 22 and the welding operation is arranged to form fully the rib 23. The contact element 24 is welded to the arm 20 by a flat tool 25 having a tipped welding surface 26 of the nature shown in the previous figures.

As previously pointed out, the surfaces to be interengaged must be cleaned in a suitable manner in order to ensure direct metal-to-metal contact which will not only increase the current carrying capacity but also will permit the cold weld to occur. Any oxide film which may have been formed owing to delay in squeezing together the contact element and the contact arm by the cold weld process, before the cold weld process is applied to the cleaned metal surfaces, will generally be small if the delay is only a matter of hours and will be dispersed by the flow at the interface so that metal-to-metal contact will nevertheless occur.

Since the pressure applied results in a flow of metal at the interface until the grains of the two metals are bonded thereat, the welding pressure must be so applied as to permit unrestricted flow of metal laterally away from the weld point; this is provided for in the contact arrangement herein described and also enhances the formation of the contact arrangement and the efficiency of the contact when formed.

Although the metal thickness has been reduced substantially over the welding area, the metal has been work hardened to twice its original strength. Thus, appropriate dimensioning of the parts which are to be welded will result in an ultimate contact element and contact arm combination which will be inherently at least as strong as the original contact arm prior to the working thereof.

This in itself is a distinct improvement over prior contact elements which at the least required working of the whole contact arm after formation to restore its original hardness and could not, therefore, be hardened or toughened only at the weld or point of stress as is possible in the present invention.

Naturally, the combined hobbing or forging and cold welding process described above can be applied to other articles than electrical contacts. Thus, it can be applied to the decoration of metal articles, to the securing or supporting feet to the bottom of containers and in fact for any purpose, where a projecting member is to be applied to the surface of another member and where both members consist of metal capable of being cold pressure welded, such as aluminum, copper or a suitable alloy.

As is understood, the recess 17 may have any desired shape corresponding to the shape of the contact 18 or other projection to be formed upon the member 10. Furthermore, members 10 and 11 may be either of the same or different metals and of a desired thickness to produce a contact or projection of a desired height or shape.

If the formation of a projection is not desired and the disc or like member 11 is merely to be secured to the support 10, recess 17 may have only a small depth or may be omitted entirely. In this case, the gaps 14 between the arc-shaped welding tips 13 should be of a sufficient width to provide a pressure outlet from the center and to enable the displaced metal readily to flow radially outwardly or away from the operative pressure or welding areas of the tips 13, to thereby insure an efficient cold weld of high mechanical strength and with a minimum of reduction in thickness at the welds.

Figure 7:
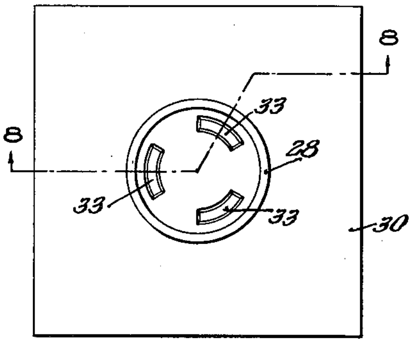
Figure 7 is a top view of a general circular or ring-shaped cold pressure weld according to the invention for joining a pair of metal surfaces.
Figure 8:
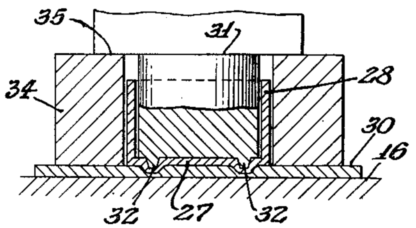
Figure 8 is a section showing the specific construction of a die assembly shown in the end position of the welding operation, for producing a weld of the type of Figure 7.

An arrangement of the latter type is shown in Figures 7 and 8, wherein a disc-shaped member 27, in the example illustrated forming the bottom of a cup 28, is welded to a flat plate or sheet 30 by means of a cylindrical die 31 fitting the inside of the cup 28 and provided with three arcuate welding tips or segments 32 spaced at angle 120° from one another, so as to result in welds as shown at 33. The latter are displaced angularly by gaps having a width being a multiple of the width of the welds 33. As a result, a central recess, as shown at 17 in the previous figures, in the die 31 is not required, the gaps or interruptions between the arcuate tips 32 providing a sufficient space to afford a pressure outlet in a radially outward direction and also to transmit a portion of the load to the inner sides of the pressed areas.

As is understood, element 27 may form an electric contact with or without a central contact or tip and being cold welded unto a base or arm 30 by the welds 33, i. e. disc 27 need not be embedded in the arm 30 as shown in the previous illustrations.

In order to control the reduction in thickness of the members 27 and 30 at the welding areas 33 and to prevent distortion of the metal plate 30, a collar 34 is provided between a shoulder 35 on the tool 31 and the plate 30. Again the reduction of the total thickness of the members 27 and 30 at the welds 33 is characteristic of the metal, being about 70% in the case of aluminum and 86% in the case of copper.

While there have been shown in the drawings tool assemblies for applying welding pressure to the pressure or welding areas in one direction only with the members to be welded being supported by a flat anvil during welding, it will be understood that the welding may be effected by pressing from both sides, especially in connection with arrangements of the type shown in Figures 7 and 8. For this purpose, a second tool similar to the tool 31 is provided in place of the anvil 16, both tools forming part of a suitable press and being provided with welding tips in exact register with each other, as will be readily understood.

It will be furthermore understood that the method of forging and/or embedding a first member in and welding it to a second member such as shown in Figures 1 to 5, by first applying pressure to a selected partial welding area until reaching an initial partial reduction in the thickness of the members thereat and thereafter continuing and extending the pressure over the entire surface of the first member, to produce both a forging and/or embedding as well as a welding effect in the manner described, has many other uses besides the manufacture of electrical contacts and applies equally to welds differing from the specific segmental shape as shown and disclosed herein for illustration.

In the foregoing, the invention has been described in reference to a few specific illustrative devices. It will be apparent, however, that variations and modifications may be made, without departing from the broader spirit and scope of the invention as set forth in the appended claims. The specification and drawings are accordingly to be regarded in an illustrative rather than a limiting sense.

I claim:

1. A composite method of pressure welding and forging comprising placing a disc upon a plate or the like, both consisting of pressure weldable metal, supporting said plate, applying to a plurality of angularly spaced segmental and strip-like welding areas spaced from the outer edge of said disc and coinciding with the circumference of a circle concentric with said disc a pressure, to effect indentations of the disc metal at said areas into and below the surface of said plate and a lateral metal flow conducive to pressure welding at said areas, and while continuing the pressure application to said areas applying pressure to the metal of said disc lying between the circle of welding areas and the edge of said disc, to embed said latter metal into said plate and flush with the surface thereof, thereby to leave the metal of said disc within said circular welding area raised above said plate.

2. A composite method of pressure welding and forging comprising placing a disc upon a plate or the like, both consisting of pressure weldable metal, supporting said plate, applying to a plurality of angularly spaced segmental and strip-like welding areas spaced from the outer edge of said disc and coinciding with the circumference of a circle concentric with said disc a pressure, said areas having a width about equal to the thickness of said disc, to effect indentations of the disc metal at said areas into and below the surface of said plate and a lateral metal flow conducive to pressure welding at said areas, and while continuing the pressure application to said areas applying pressure to the metal of said disc lying between the circle of welding areas and the edge of said disc, to embed said latter metal into said plate and flush with the surface thereof, thereby to leave the metal of said disc within said circular welding area raised above said plate.

3. A method of forming a contact point upon a copper plate by pressure welding comprising placing a disc of silver upon said plate, supporting said plate, applying to a plurality of angularly spaced segmental and strip-like welding areas spaced from the outer edge of said disc and coinciding with the circumference of a circle concentric with said disc a pressure, said areas having a width about equal to the thickness of said disc, to effect indentations of the disc metal at said areas into and below the surface of said plate and a lateral metal flow conducive to pressure welding at said areas, and while continuing the pressure application to said areas applying pressure to the metal of said disc lying between the circle of welding areas and the edge of said disc to embed said latter metal into said plate and flush with the surface thereof and to effect a final metal reduction at said indentations of about 86% of the total thickness of said disc and plate, thereby to leave the metal of said disc within said circular welding area raised above and to form a contact point upon said plate.

References Cited in the file of this patent

UNITED STATES PATENTS

| | | |
|---|---|---|
| 334,554 | Allstatter | Jan. 19, 1886 |
| 1,482,818 | Shipman | Feb. 5, 1924 |
| 1,694,629 | Schaer | Dec. 11, 1928 |
| 2,018,073 | Laise | Oct. 22, 1935 |
| 2,361,089 | Cox | Oct. 24, 1944 |
| 2,467,913 | Sanders | Apr. 19, 1949 |
| 2,522,408 | Sowter | Sept. 12, 1950 |

OTHER REFERENCES

Metal Industry, May 21, 1948, pp. 417 and 418.